US011034291B2

(12) United States Patent
Ejiawoko (10) Patent No.: US 11,034,291 B2
(45) Date of Patent: Jun. 15, 2021

(54) GARMENT WITH INTEGRATED NOTIFICATION LIGHTS FOR TURNING, BRAKING, HAZARD AND EMERGENCY THAT COMMUNICATES WITH A VEHICLE WIRELESS PROTOCOL

(71) Applicant: Michael Ejiawoko, Las Vegas, NV (US)

(72) Inventor: Michael Ejiawoko, Las Vegas, NV (US)

( * ) Notice: Subject to any disclaimer, the term of this patent is extended or adjusted under 35 U.S.C. 154(b) by 30 days.

(21) Appl. No.: 14/549,427

(22) Filed: Nov. 20, 2014

(65) Prior Publication Data

US 2016/0144775 A1     May 26, 2016

Related U.S. Application Data

(60) Provisional application No. 61/907,070, filed on Nov. 21, 2013.

(51) Int. Cl.
| | | |
|---|---|---|
| *B60Q 1/34* | (2006.01) | |
| *B60Q 1/26* | (2006.01) | |
| *A41D 13/01* | (2006.01) | |
| *A41D 27/08* | (2006.01) | |

(52) U.S. Cl.
CPC ........... *B60Q 1/2673* (2013.01); *A41D 13/01* (2013.01); *A41D 27/085* (2013.01)

(58) Field of Classification Search
CPC ...... B60Q 1/34; B60Q 1/2673; A41D 27/085; A41D 13/01
USPC ..................................... 340/463–479, 573.1
See application file for complete search history.

(56) References Cited

U.S. PATENT DOCUMENTS

| | | | | |
|---|---|---|---|---|
| 8,009,031 | B2 * | 8/2011 | Pacheco | B60Q 1/2665 340/479 |
| 2002/0044052 | A1 * | 4/2002 | Stewart | A41D 13/01 340/475 |
| 2003/0213045 | A1 * | 11/2003 | Fuentes | A41D 13/01 2/69 |
| 2007/0063831 | A1 * | 3/2007 | Perkins | B60Q 1/2673 340/479 |
| 2007/0192925 | A1 * | 8/2007 | Fitzpatrick | A41D 15/005 2/69 |
| 2010/0253501 | A1 * | 10/2010 | Gibson | A41D 13/01 340/475 |

(Continued)

*Primary Examiner* — Brent Swarthout
(74) *Attorney, Agent, or Firm* — Bayramoglu Law Offices LLC (57) ABSTRACT

An apparatus and garment with protective padding and covering for use by motorcycle or recreational vehicle operators having integrated turning signals and notification lights to be illuminated in the case of turning, braking, hazard, or emergency. A Garment configured to have the ability to communicate with the motorcycle electronic module via a wireless protocol to provide synchronous turning signals and braking notifications lighting to other vehicle operators in the rear or side or oncoming traffic. Control of lighting integrated and configured via electronic control unit with switches or toggles located in sleeves and cuffs of a Garment. Battery pack for electronics and lighting within interior of a Garment. Primary lighting control via wireless communication protocol and tethered power source or control mechanism integrated as a redundant option for control within a Garment.

13 Claims, 9 Drawing Sheets

(56) References Cited

U.S. PATENT DOCUMENTS

2013/0093585 A1* 4/2013 Ambani ............... A42B 3/0413
340/475
2015/0187187 A1* 7/2015 Del Toro ............ H04W 68/005
340/539.11

* cited by examiner

Ten LED String, One for each Jacket Section

GARMENT WITH INTEGRATED NOTIFICATION LIGHTS FOR TURNING, BRAKING, HAZARD AND EMERGENCY THAT COMMUNICATES WITH A VEHICLE WIRELESS PROTOCOL

CROSS REFERENCE TO THE RELATED APPLICATIONS

The present application is based on and claims benefit of provisional patent application Ser. No. 61/907,070 filed on Nov. 21, 2013, the entire contents of which are incorporated herein by reference.

TECHNICAL FIELD

This invention relates generally to apparel with protective padding and covering, but particularly to motorcycle outerwear or jacket having integrated turning signals and braking warning within an instant Garment that communicates with a motorcycle via a wireless protocol or wired apparatus (a "Garment"). The mechanical signals and braking indicators of the motorcycle will trigger and activate the appropriate and corresponding instant Garment turning signals and braking indicators in a synchronous manner.

BACKGROUND

General applications of turning signals and braking indicators integrated in articles of apparel are not unique designs or endeavors. Over the history or motorcycles and recreational vehicles the proponents of safety have made every effort to provide greater visibility for the riders especially during braking and performing turns. The goal was to make the rider more visible to fellow motorists and thus safer as they ride. However, the execution of these examples of jackets with lights building into them has been lacking and unsatisfactory to date. The problem still remains to provide greater visibility for motorcycle riders without a compromise of freedom or a tether to the motorcycle or recreational vehicle. A Garment, described and claimed in this application, solves this problem by providing synchronous turn signals and braking indicators within an instant Garment with the communication between the motorcycle and an instant Garment executed via a wireless protocol or with the option to utilize said technology via a tether from an instant Garment to the motorcycle.

The evaluation of prior art in this field of technology must begin with U.S. Pat. No. 6,538,567, filed Aug. 21, 2001, which relates to a motorcycle jacket which has turn signal lights attached to the back of the jacket in the upper left and right shoulder areas. The lights of this jacket are designed and configured on the back of the jacket only and not envisioned elsewhere in varied embodiments. The lights are electrically connected to the motorcycle electrical system, so that when the motorcycle turn signals are actuated, the jacket turn signal will flash in synchronism with them. This patent accomplishes a rudimentary solution to the problem identified above but only provides the option of a tethered solution and does not address the integration with the motorcycle. The patent discusses leads sewn into the jacket which are to be connected to the electrical system of the motorcycle. No discussion exists of a wireless option to integrate with the motorcycle. The freedom of the operator is compromised without a wireless option. Additionally, the operator is required to reconnect the jacket to the motorcycle each time the operator chooses to the ride the motorcycle. A wireless synchronization of the jacket and the motorcycle provides for a worry-free solution and does not rely of the operator to engage the safety and signaling options. This application is a valid attempt to solve the visibility issue and integrate signaling and braking into outwear, but it falls short of the mark and does not provide the novel element of a wireless system of communication to the jacket as a Garment provides.

Many other lighted apparel options for motorcyclists have been patented but these patents miss the mark and focus more so on decorative or entertainment purposes. For example, U.S. Pat. No. 4,602,191, filed on Jul. 23, 1984, which is part of the public domain relates to a jacket with programmable lights or LEDs in an instant Garment that emit tri-color representations. The LEDs are connected to a flexible printed circuit board which adheres to the inner surface of an instant Garment. The lights are fully programmable as both to their color and their activation. The LEDs form a matrix which permits the user an alpha-numeric or graphical display. This invention is specifically designed for advertising and entertainment purposes in mind rather than addressing the issues specific to motorcycle user safety. As such this application is in the field of technology but is not considered conflicting prior art because the application does not address integration with the motorcycle for signaling or braking. As such the application is not germane to this a garment. Additionally, there are a series of other patents that are similar to this prior art. Examples of said prior art can be located at U.S. Pat. Nos. 4,709,307; 5,113,325; 5,278,734; and 5,613,756.

Within the motorcycle and cyclist community there is always an effort to provide greater safety for the users. Specifically, within the public domain there are examples of small businesses or individual members of the motorcyclist community creating outerwear with integrated signaling and braking into an instant Garment. Turn signal jackets and vests are available for purchase, even if they are hard to find and less likely to function as described. There are also many examples one can find of "do it yourself" signal vests or jackets that claim to provide turn signals or increased braking visibility. However, these options always fall short in the element where a Garment excels, particularly the wireless integration with the motorcycle. The homemade jackets or vests rely of the user to engage the signaling options twice, once for the motorcycle and yet again for the outwear, which results in the user being more occupied with the functionality of an instant Garment and less attention provided to operations of the motorcycle. The signal vests and jackets another valid attempt to solve a bigger problem but do more to exacerbate or reduce the operator's safety rather than increase the safety. A Garment solves this problem via a wireless synchronization with the motorcycle's signaling and braking. The user's attention is not bifurcated between the motorcycle and an instant Garment, but rather is focused on the operations of the motorcycle, thus increasing the safety of the user.

An example of a popular product on the market today that relates to this field of technology is the Triumph Light Jacket. The idea behind the Triumph Light Jacket has been around in concept form for a few years. Taking advantage of the low power draw, high brightness and compact size of modem LEDs, lights are incorporated into the jacket and vest to enhance rider visibility on the road. Triumph claims that the jacket is more effective than reflective materials, which rely on a direct light source. Incorporated into riding instant garments with virtually no weight and no compromise to wear-ability, this sounds like a great safety solution.

However, the jacket relies exclusively on a power source within the jacket that is not very powerful and only provides a relatively short time for illumination. A Garment will provide a more robust battery option or the ability to draw power directly from the motorcycle to power the signal and braking. The other main issue and delineation between the Triumph Jacket and a Garment is the integration with the motorcycle. A Garment can provide signaling and braking synchronization with the motorcycle, whereas the Triumph Jacket cannot. The Triumph Jacket is a continuous short use lighting option that will increase the viability of the user but does nothing to improve the visibility when the users want to indicate a signal or warn of braking to vehicles in the rear. Ultimately, the Triumph Jacket is an alternative light source and is also not germane to the evaluation of a Garment.

One of the earliest attempts seen in in this field was U.S. Pat. No. 1,209,059, issued Dec. 19, 1916, to Smith. A bare bulb, electrically connected to a battery, is attached to the sleeve of a driver, so that when the driver's arm is out of the window making the motions of a turn signal, the light will move with the arm and be visible to other motorists. This patent may be considered the founding father of this field of technology. However, it falls short of solving the integration problem and relies of the user to engage both the vehicle signaling mechanism and the outerwear signal.

Further there is an international element to this field of technology related to Japanese Patent No. JP2265101, issued Oct. 29, 1990 to Hitoshi et al. discloses a jacket with a printed circuit board attached in the middle of its back. Matrixes of light emitting diodes (LEDs) are mounted on the printed circuit board which is operationally connected with a motorcycle power source via a programmable operating system. A manipulated graphic with or without text can be displayed on the printed circuit board. The disclosure is very broad with few details, but apparently, when used as a turn signal, a large arrow is formed across the entire board by lighted LEDs, when a turn signal switch is activated by the biker, the arrow pointing in the direction of the turn. While the patentees state that the "turn signal" is activated by a "blinker," it is not clear whether or not the arrow itself flashes on and off. Other displays, such as personal messages, are also programmed into the operating system. The system is expensive, requires separate attachment to the jacket, and the turn signal indication is not the type to which United States drivers are accustomed, opening the possibility that rather than being a clear notification of a turn, it could actually confuse other drivers.

In this field of technology, one must also consider warning lights, including turn signals that have been placed on motorcycle helmets in U.S. Pat. No. 4,559,516, issued Dec. 17, 1985 to Schott et al., U.S. Pat. No. 5,207,500, issued May 4, 1993 to Rios et al., and U.S. Pat. No. 6,097,287, issued Aug. 1, 2000 to Lu. The helmet of Schott et al. is self-contained with the battery, switches, circuitry, and lights built-in, a complicated combination, which is expensive to manufacture, and which adds to the weight of the helmet. The turn signal switches are inertia switches operable by movements of the cyclist's head, a system prone to accidental actuation, for a motorcyclist's head is constantly moving. Rios et al. include turn signals, a brake light, a taillight, and a head light in their helmet design, making for a large and heavy combination. All of the lights of Rios et al. are powered and actuated by the motorcycle's electrical system. While a multi-lighted helmet is more easily seen by other motorists than one without lights, the light array disclosed by Rios et al. must present a confusing display. The cyclist's head is constantly rotating, thereby constantly changing the position of the left and right turn lights relative to the bike body, which leaves following drivers to wonder what, if anything is being indicated. Lu adds to the conventional helmet only a brake light, inductively coupled to the brake system of the motorcycle. No indications of turns are involved. These examples are yet again serviceable lighting options without any integration into the operation of the motorcycle. A Garment considers these lighting options and advances the technology by adding synchronization between the outerwear and jacket with the motorcycle.

Safety lights have also been placed on other wearing apparel, to be worn by policemen, joggers, runners, bicyclists, etc., to warn motorists or others in the vicinity of their presence. See U.S. Pat. Nos. 3,153,745; 5,070,436; 5,488,361; and 5,690,411. Only the last, issued Nov. 25, 1997, to Jackman includes manually actuated "turn signals" incorporated into a jogger's vest. They are powered by batteries carried by the wearer, adding to an instant Garment's weight and complexity.

In conclusion, insofar as the inventor is aware, there is no apparatus, jacket, outerwear, or garment that has integrated turn signals and braking lights within the various garments that also provides integrated wireless synchronization with the electrical system of a motorcycle or recreational vehicle. A Garment provides protective padding and covering, but particularly provides integrated turning signals and braking warning within the apparel that communicates with the motorcycle via a wireless or wired apparatus. Therefore, the registration of a Garment and this application is warranted and should be authorized as a novel and non-obvious advancement on the current art and technology.

SUMMARY

This embodiment of a Garment is an apparatus and invention that assists with the difficulties of motorcycle drivers being observed and noticed by other motorist, particularly when the motorcycle users is in the act of turning or braking. Functionally, this invention may be outerwear or a jacket that has turn signal lights and braking notification lights sewn or attached to an instant Garment. The electronics and mechanism of the lighting may communicate and synchronize with the electronics of the motorcycle via a wireless module and protocol or a wired apparatus or via a tethered power source. The integration of the wireless technology may provide a user with seamless synchronization of the motorcycle and instant Garment turn signals and braking notification, and thus, relieving users of the need to engage redundant turn signals (jacket and motorcycle) or apply two braking notifications. A Garment may be made with light weight fabric, leather, or any appropriate composite to provide protection and advanced viability for a user. A Garment improves the viability of the motorcycle user and improves the overall safety of the cyclists and other motorists.

A Garment as a motorcycle jacket or outerwear and current embodiment with turn signal lights and braking notification lights sewn or attached to said Garment. The electronics and mechanism of the lighting synchronizes and communicates with the motorcycle electrical system via a wireless module and protocol or via a tethered connection. A Garment may have four rows of lights on the back of the jacket or Garment with the two outside rows of lights dedicated to turn signal indication and the two inside rows of lights dedicated to braking indicators. Three rows of lights on each arm of a Garment positioned in a gradient to give the look of a turning arrow may be placed on the back of each arm of a Garment to facilitate the turning indication and signal.

Additionally, turning indicator lights will be placed on the left and right arms to provide positive feedback to the user and wearer of a Garment that the indicator lights on an instant Garment are functioning properly. To accommodation for oncoming traffic, an embodiment may have similar turning signal lights starting approximately at the collar bone position of the current embodiment and continuing down the front of a Garment to the approximately the armpit. These signal lights will be positioned facing forward toward oncoming traffic as a safety option rather than positioned directly vertical and facing upward. As a redundancy feature, the left and right side sleeve cuffs of this embodiment may have a manual switch, light, or trigger to allow the user to turn on the turning signal for the appropriate turn if the wireless apparatus and synchronization with the motorcycle is not functioning properly. There will also be a spring-loaded cord in both the right and left arm sleeves sewn into this embodiment that will run the lengths of the sleeve to the user's palm that may be used to engage the signals of an instant Garment from the motorcycle.

Further, it is envisioned that in all embodiments of a Garment, the lighting configuration will be an always "on" status to improve viability of the motorcycle operator and a Garment worn by the operating user. The signal lighting will increase in intensity and brightness according to the proper command from the electronic MCU.

Finally, light sensors for appropriate brightness and functionality of the embodiment will be integrated in directly in the MCU board. Signal lighting will be bright enough for visibility to other parties from the side, front, or rear.

BRIEF DESCRIPTION OF THE DRAWINGS

Other features, functionality, and advantages of the present invention will become more apparent from the following detailed description of an instant Garment and its derivatives and certain modifications thereof when taken together with the accompanying drawings in which.

DETAILED DESCRIPTION OF THE EMBODIMENTS

Although the above-described certain embodiments of a Garment, to make a detailed description, but is not limited to the above embodiments of a Garment. Those skilled in the art will appreciate without departing from the technical scope of the present utility model the features and technical solution of the given case, an increase in the technical characteristics made to replace some of the same content in the art, and should belong to the present Garment and utility model within the scope of protection.

Figure 1:
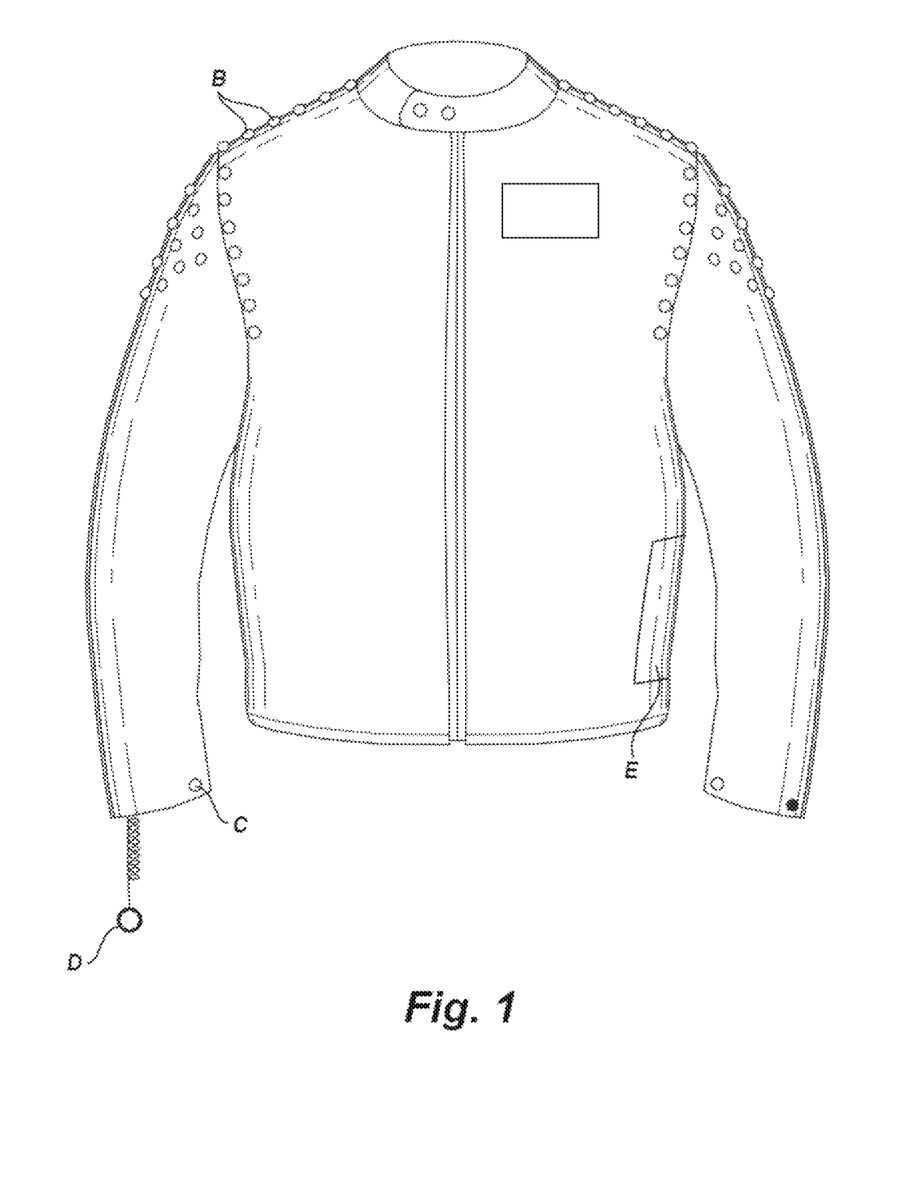
FIG. 1 is a front view of an instant Garment depicting the layout and placement of the notification lights that can be observed when viewing the oncoming user.

FIG. 1 is a front view of an instant Garment depicting the layout and placement of the notification lights that can be observed when viewing the oncoming user.

a. One embodiment may include a wireless technology for a communication protocol transferred between sensor and receiver. A remote on a certain embodiment will control the electronics in a Garment and the lighting components of a motorcycle. A sensor with a proximal radius of influence of approximately fifty feet, but no less than fifteen feet, to allow for communication of user wearing a Garment and operation of motorcycle or vehicle.

b. Outer line or array of notification lights, positioned on the crest of an instant Garment's shoulder construction. Multiple notification lights depending on size and appropriate placement of bulbs. Notification lights intended to flash off and on in a designated color when engaged by user within the trigger switch of an instant Garment or from a wireless communication protocol originated from the motorcycle electronic signal. Outer array of notification lights may act as emergency flashers and warning pursuant to user interface and control option. An inner array of notification lights will engage and increase lamination and brightness when an instant Garment user applies the hand or foot brake. Both array of notification lights positioned on the shoulder construction will notify of an engaged turn signal subject to the communication from an instant Garment user via the trigger switch on an instant Garment or via the motorcycle turning signal via a wireless communication protocol.

c. A variable function signal or trigger switch particularly adapted for use with a Garment. User operated individual signal switch or trigger switch to enable the user to engage the appropriate notification lights for the appropriate brake, turning, hazard, or emergency illumination by the integrated notification lights.

d. A spring loaded signal button and cord integrated within an instant Garment that can be pulled out and wrapped around the appendage or finger of an instant Garment user. Functionally, the signal button wrapped around a finger should and is intended to engage when the user grips or pushes down on the handle bar of the motorcycle. A spring loaded signal will also be able to wrap around the palm of a user's hand to provide the same functional mechanism as the signal button position on the finger. Applying pressure to a signal button on a spring loaded mechanism from moving a palm to the hip or leg to engage a signal and illuminate the notification lights positioned on this embodiment. A spring loaded mechanism and cord with a plurality of spring-loaded options are adapted to pivotally deploy signal button when depressed and to hold signal button in the stowed position when retracted within the sleeve of an instant Garment. Option to manually retract spring loaded cord to its original position.

e. Rechargeable battery mechanism that is portable and removable from an instant Garment, thus allowing for rapid power source change or alternative size to better accommodate user's comfort in an instant Garment. The rechargeable battery mechanism consists of a battery pack, an integrated connector, and a cord modified to use a standard socket. The battery pack is comprised of a standard rechargeable battery measuring approximately five and one quarter inches by two and one half inches by five eighths inches. The integrated connector is comprised of an interface enabling the battery pack to charge by the power supplied by the modified cord attached to an instant Garment. The modified cord is comprised of a standard wire connecting the battery pack to the power source via a standard outlet.

Figure 2:
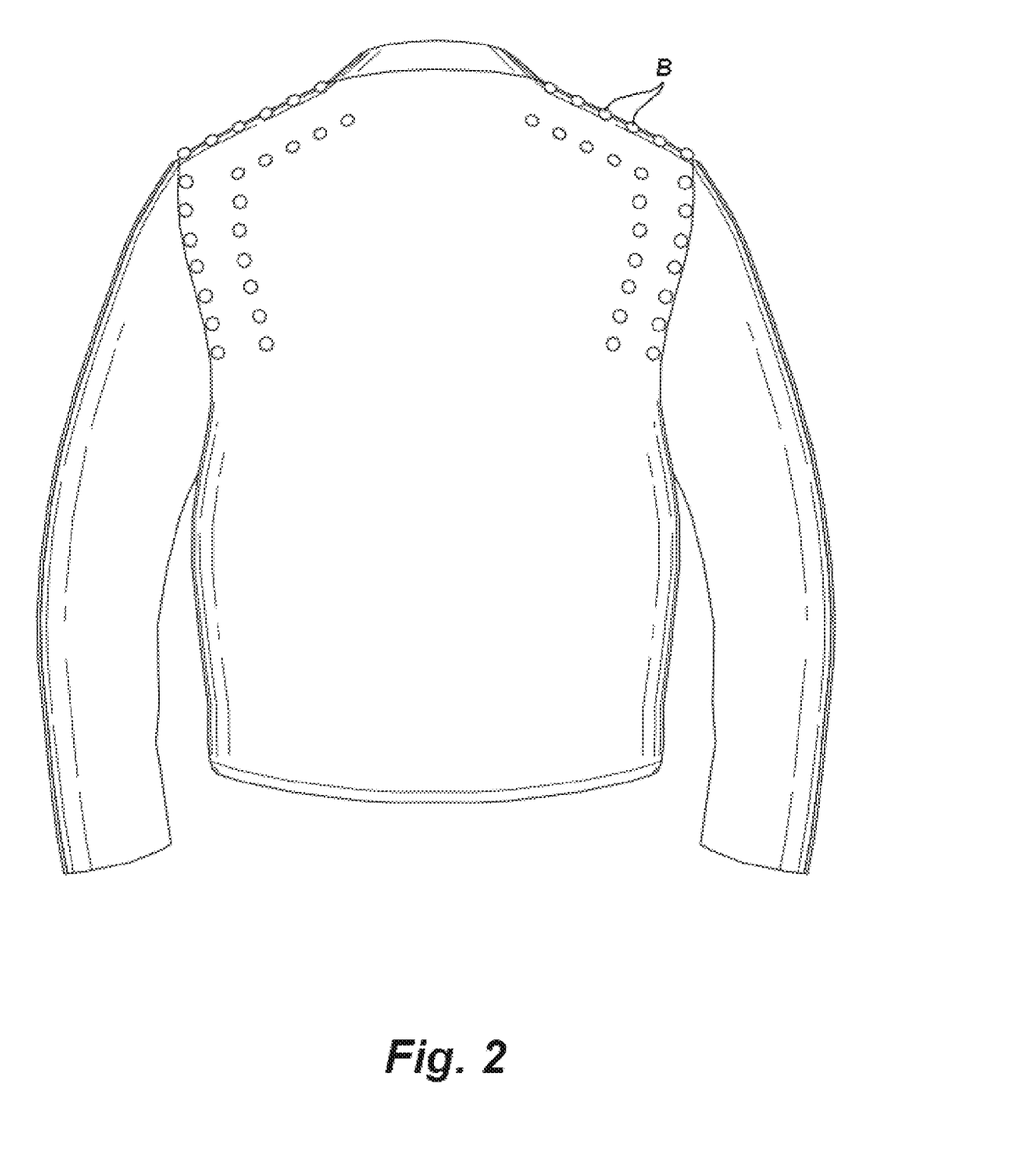
FIG. 2 is a rear view of an instant Garment depicting the layout and placement of the notification lights that can be observed when viewing the user from rear or trailing aspect.
Figure 3:
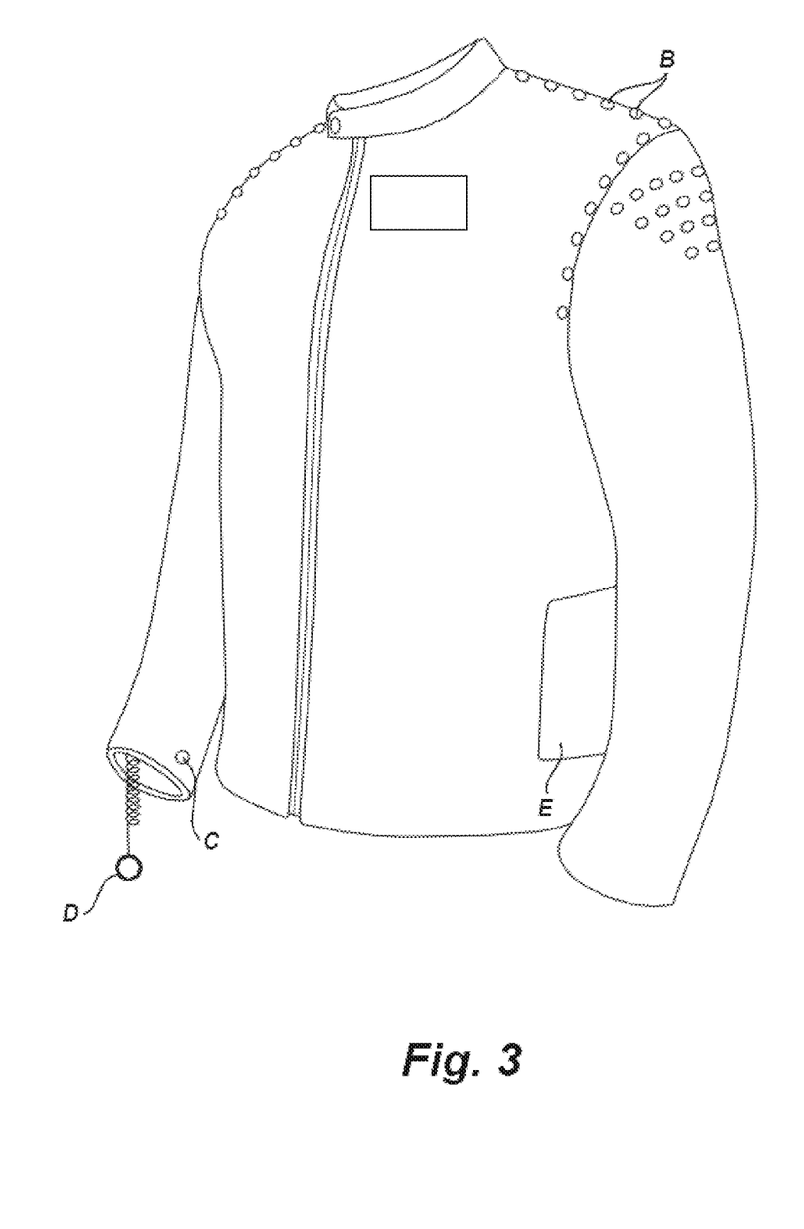
FIG. 3 is a partial side view of an instant Garment depicting layout and placement of the notification lights that can be observed when viewing the user from a side profile.

FIG. 2 is a rear view of an instant Garment depicting the layout and placement of the notification lights that can be observed when viewing the user from rear or trailing aspect.

a. All reference incorporated and presumed from description in FIG. 1 subsections a-e.

b. Outer line or array of notification lights, positioned on the crest of an instant Garment's shoulder construction. Multiple notification lights depending on size and appropriate placement of bulbs. Notification lights intended to flash off and on in a designated color when engaged by a user within the trigger switch of an instant Garment or from a wireless communication protocol originated from the motorcycle electronic signal. Outer array of notification lights may act as emergency flashers and warning pursuant to user interface and control option. An inner array of notification lights will engage and increase lamination and brightness when an instant Garment user applies the hand or foot brake. Both array of notification lights positioned on the shoulder construction will notify of an engaged turn signal subject to the communication from an instant Garment user via the trigger switch on an instant Garment or via the motorcycle turning signal via a wireless communication protocol FIG. 3 is a partial side view of an instant Garment depicting layout and placement of the notification lights that can be observed when viewing the user from a side profile. All reference incorporated and presumed from description in FIG. 1 subsections a-e. No additional data or description required for labeled diagrams.

Figure 4:
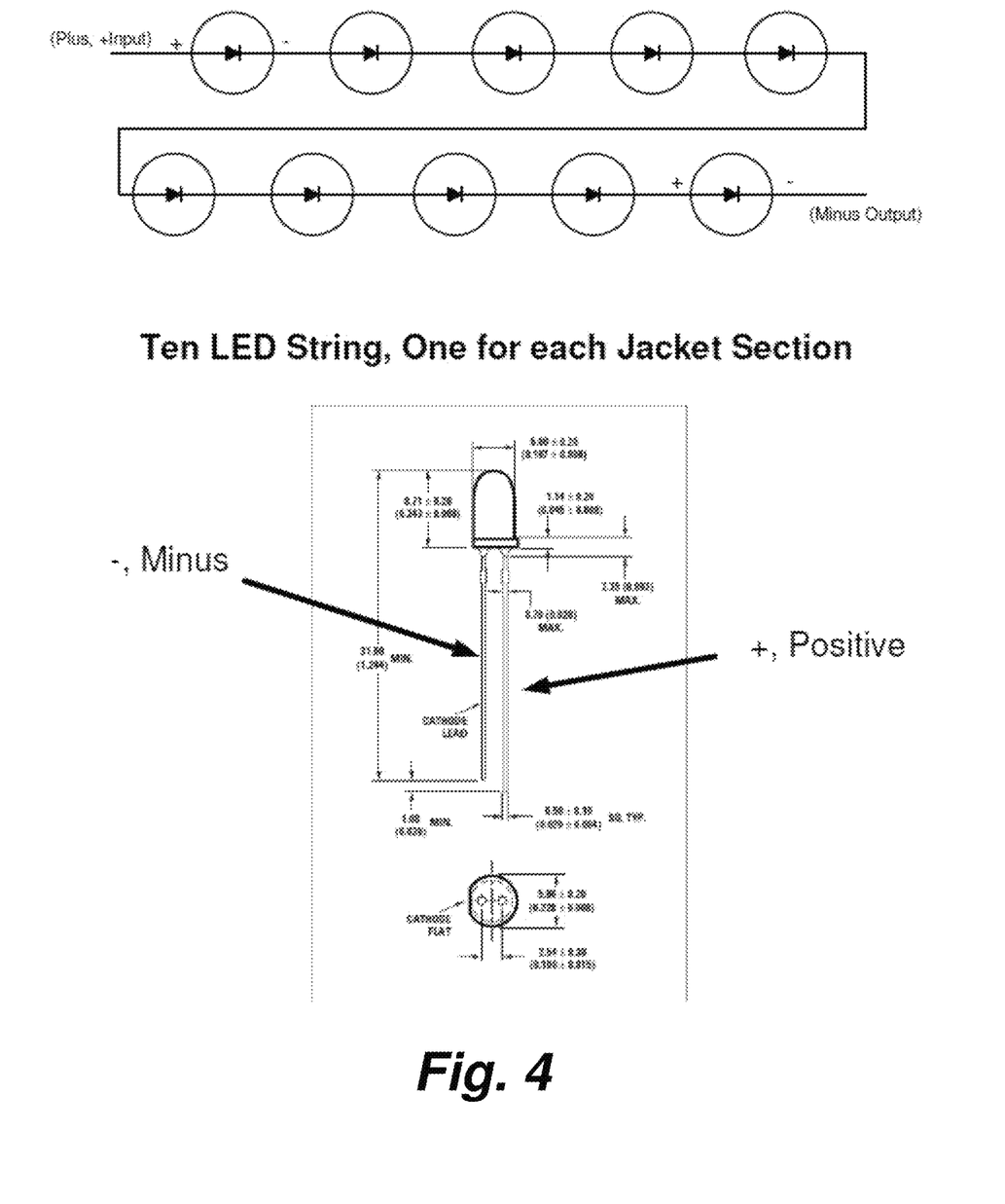
FIG. 4 is a depiction of the LED notification lights within the interior of a Garment.

FIG. 4 is a depiction of the LED notification lights within the interior of a Garment with specificity toward the LED construction of one embodiment of a Garment.

a. Depiction of a daisy chain configuration of LED lights with a positive input and negative. output. Ten LED string for each section of a Garment represented by diagram. LED specifications as indicated in diagram in one embodiment adhering to physical metrics and schematics.

b. Cathode lead depicted as negative or minus and Diode lead depicted as positive or additive circuit.

Figure 5:
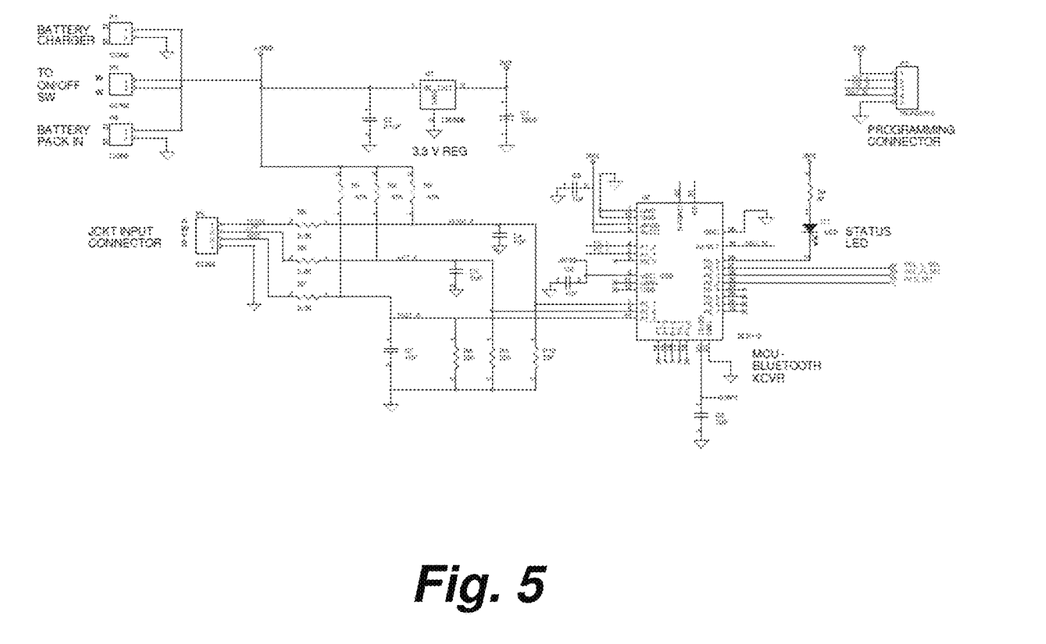
FIG. 5 is a depiction of the MCU Schematic of LED notification lights within the interior of a Garment.

FIG. 5 is a depiction of the MCU Schematic of LED notification lights within the interior of a Garment. The present embodiment includes a battery charger, toggle on/off switch, battery pack within a Garment, an input connector, programming connector, a series of LED status lights, and the MCU control unit connected wirelessly configured via Bluetooth standard protocols.

Figure 6:
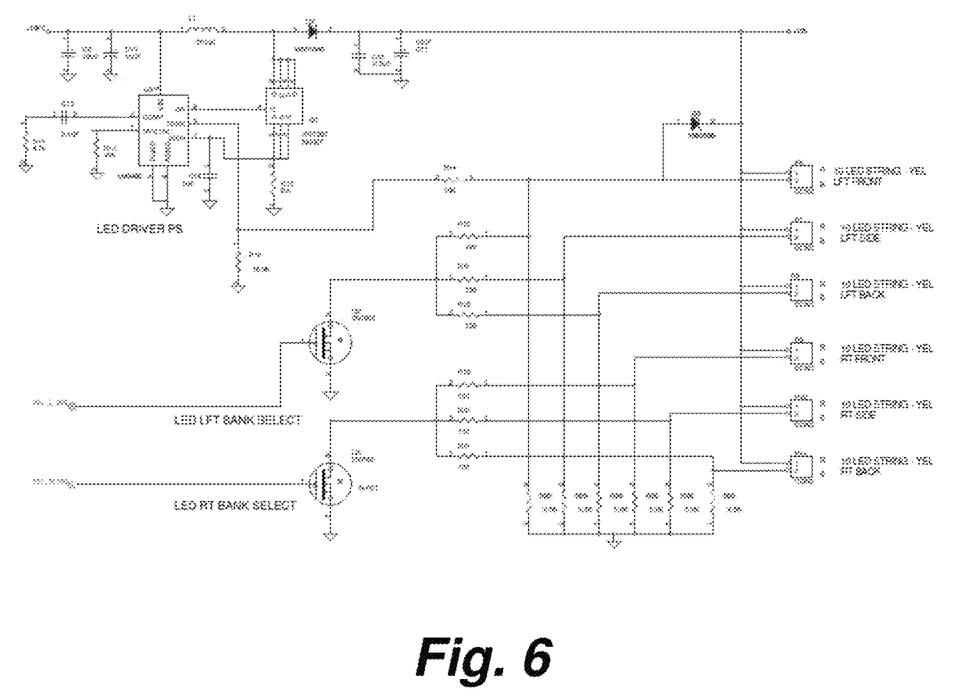
FIG. 6 is a depiction of the YELLOW Electrical Drivers Schematic of LED notification lights within the interior of a Garment.

FIG. 6 is a depiction of the YELLOW Electrical Drivers Schematic of LED notification lights within the interior of a Garment. The present embodiment includes a series of Yellow string LED lights controlled and configured to respond to an LED Driver power switch, with LED left and right bank selectors within the current embodiment of a Garment.

Figure 7:
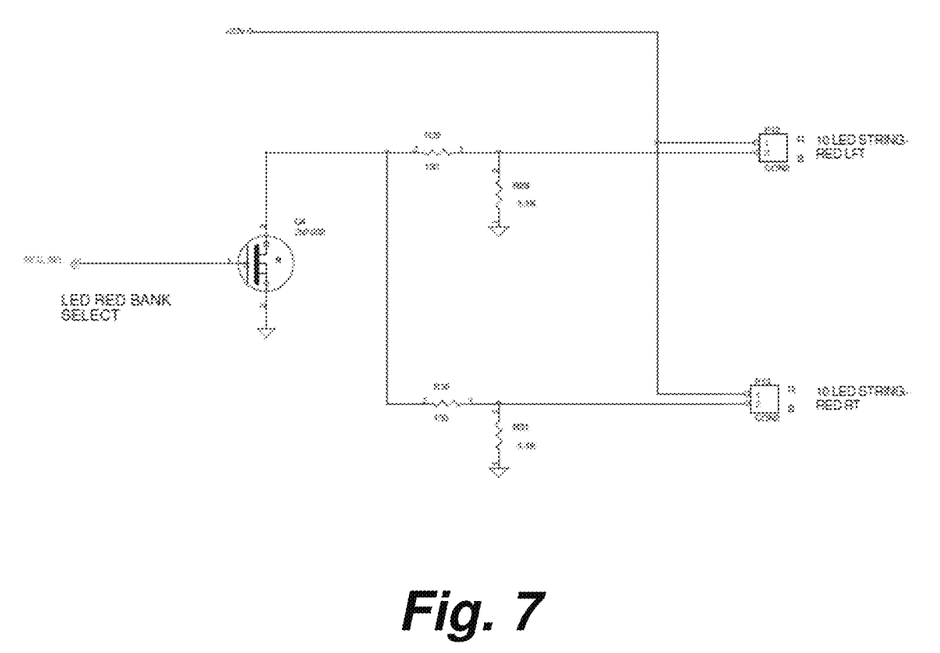
FIG. 7 is a depiction of the RED Electrical Drivers Schematic of LED notification lights within the interior of a Garment.

FIG. 7 is a depiction of the RED Electrical Drivers Schematic of LED notification lights within the interior of a Garment. The present embodiment includes a series of Red string LED lights controlled and configured to respond to an LED Driver power switch, with LED a bank selector within the current embodiment of a Garment.

Figure 8:
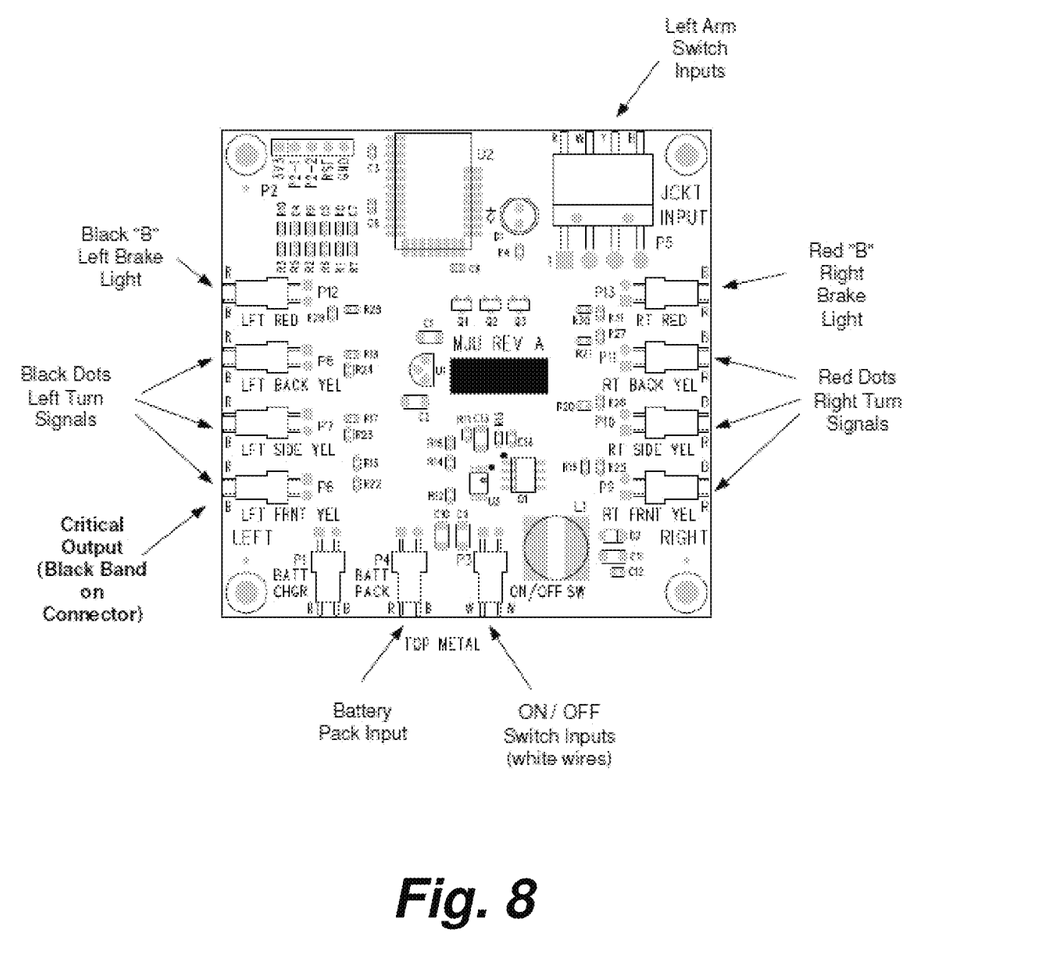
FIG. 8 is a depiction of the Printable Circuit Board (PCB) and wiring layout of one embodiment within the interior of a Garment.

FIG. 8 is a depiction of the Printable Circuit Board (PCB) and wiring layout of one embodiment within the interior of a Garment. The present embodiment includes a PCB configured to interface with left/right brake light modules, left/right turn signal modules, a critical output module, battery pack input and switch inputs all within an embodiment of a Garment.

A current embodiment of a Garment has 11 connectors, only 10 of which are engaged. The Left Arm Switches and ON/OFF Switch inputs are located on the upper right, and lower left of the PCB. Said inputs configured to the small PCB that is located on the Left Arm to control the Garment Input and ON/OFF functions. The cables on these connectors have specific functions. For the input switches, the wires are permanently attached. The cable from the left arm is split into two outputs cables. The two white wire cable is the ON/OFF switch input connections. A cable is attached on the lower right of the PCB in the current embodiment. The remainder of the Left arm switch cable is attached to the four pin input on upper right on the PCB.

The functions of these input switches are within the current embodiment of a Garment are:

a. Left=Momentary press—Left Turn Signals flash for 20 seconds.

b. Right=Momentary press—Right Turn Signals flash for 20 seconds.

c. Flash=Momentary press—All Turn Signal LEDs flash until the Second momentary press when they stop flashing.

d. Pressing an alternate button (Left, Right or Flash) will activate the Left, Right or Flash Function of that button. i.e., the flashing in process will stop, and the new function flash process will start immediately.

FIG. 8 depicts the Left Rear Brake and Right Rear Brake outputs are as indicated on the left of the PCB of the current embodiment. These are attached to the left and right outputs. These signal outputs are actually interchangeable if desired. The Left Turn Signal Outputs attach to the Turn Signal Outputs on the Left side Turn Signal LEDs of the current embodiment of a Garment. The Right Turn Signal Outputs attach to the Right Turn Signal outputs on the Right side LEDs of the current embodiment of a Garment. All of these signal lines are interchangeable if desired. The current embodiment has this module located at the lower PCB connectors in the middle is the "Battery Pack" input. The cable to this input comes from the battery pack located on the right side of a Garment.

A Battery Pack is located on the right side of the current embodiment and has an easy to use connector that can be removed to allow the battery pack to be charged on the external Battery Charger. The external energy Battery Charger has a mating connector to which the battery pack is attached, and current embodiment suggests to only use a slow charge of 0.9 A on the charger to charge the battery pack of this embodiment. This should charge the battery in about 3 hours and minimize internal heating. Estimation for the current embodiment shows the battery pack lasting about 40 to 60 hours on a single charge. It is best not to fully discharge the battery before recharging it or the battery life can be significantly reduced. The current embodiment of a Garment suggests recharging the battery after a significant use of a Garment.

Figure 9:
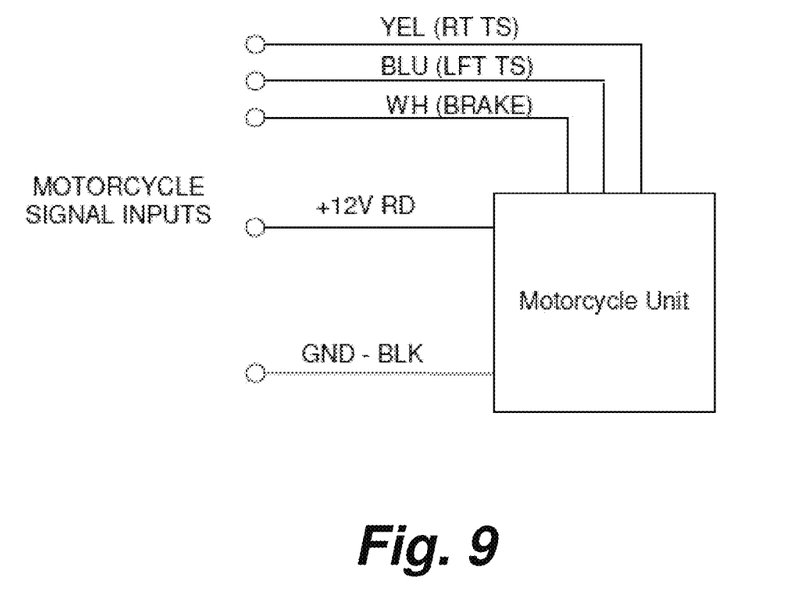
FIG. 9 is a depiction of the wiring layout of an embodiment of the Motorcycle Unit configured to a Garment.

A depiction of the wiring layout of an embodiment of the Motorcycle Unit configured to a Garment. The Motorcycle Unit of this embodiment has all input connections permanently attached to the motorcycle apparatus. This unit detects signals from the Motorcycle and sends these signals to a Garment and the electrical unit for appropriate display. These signals always override any function ongoing in the Garment and embodiment such as a Garment initiated Left or Right Turn signal flashing, or Emergency Flashing. There are five connection wires in the current embodiment of a Garment as follows:

a. Red=+12 V or Motorcycle Battery switched positive voltage from the ignition Switch.
b. White=Brake Input, the signal the goes to the positive side of the MC Brake Light.
c. Blue=Left Turn Signal input, or the signal that comes from the positive pulsing voltage that comes from the left turn signal lamp.
d. Yellow=Right Turn Signal input, or the signal that comes from the positive pulsing voltage that comes from the right turn signal lamp.
e. Black=−12 V or the Motorcycle Battery Return Signal, or Chassis or Frame Ground.

These signals are anticipated to be appropriately attached to the Motorcycle. Since these wires have no connector, they should not be directly permanently attached to the Motorcycle. This would allow the removal of the unit should that be necessary. These connections should go to a place easily reached should it be necessary. One optional method for this embodiment is to use "twist on" individual wire connections as available. Additional method of connection for this and other embodiments may include solder and may need to be added to the fine #30 wires that connect to the MCU to allow these options to be configured correctly. When this embodiment and unit are operating properly and powered ON, the LED on the Motorcycle unit flashes at an approximately a once per two second rate, but not restricted to other various timing configurations.

I claim:
1. A garment that may be worn by an operator of a motorcycle or recreational vehicle, comprising:
a plurality of lights sewn or affixed to the garment,
a plurality of manual switches or triggers integrated at sleeves and outside cuffs of the garment and configured for the operator to engage a turn signal, hazard and brake lighting,
a plurality of feedback lights is integrated in cuffs of the garment and configured to indicate to the operator of the garment whether electronics and the plurality of lights are functioning properly,
turn signal lights and brake notification lights are synchronous between the motorcycle or recreational vehicle and the garment,
wherein the plurality of lights is configured to resemble turn signal arrows or indicators, wherein the electronics are adapted to communicate via a wireless module and protocol, and adjusting the light intensity of the plurality of lights using micro controller units.

2. The garment as described in claim 1, wherein the plurality of lights comprises light emitting diodes.

3. The garment as described in claim 1, further comprising an electronics board for configuring the plurality of lights wherein the electronics board is integrated or sewn in a lining of the garment.

4. The garment as described in claim 3, wherein the plurality of lights is removable and repairable.

5. The garment as described in claim 4, wherein wireless or wired communication is used between the motorcycle and the garment.

6. The garment as described in claim 5, wherein lights of the plurality of lights that are used for turn signals and brake signals are synchronous between the motorcycle and garment.

7. The garment of claim 1, wherein the plurality of lights is powered by a battery integrated into lining of the garment, the battery comprising at least one of a battery being tethered to a power source of the motorcycle or recreational vehicle and a battery not tethered to a power source, and wherein the tether is used when the wireless protocol is not functioning properly.

8. The garment of claim 1, wherein lining of the garment has storage for the electronics, the plurality of lights, a battery, and a tether.

9. The garment of claim 2, wherein the light emitting diodes are positioned on shoulders and upper sleeves of the garment and uniformly spaced and contiguous with a seam on the shoulders of the garment.

10. The garment of claim 2, wherein the light emitting diodes are positioned in three rows on each sleeve of the garment and adapted so as to appear as a turn arrow on the back of each sleeve of the garment.

11. The garment of claim 2, wherein the light emitting diodes are configured as the turn signal arrows and are positioned in a pattern extending from near proximity to a collar bone position of the garment to near proximity to an armpit position of the garment on the front of the garment.

12. The garment of claim 2, wherein the light emitting diodes are positioned in at least one uniform line on the crest of the shoulder of the garment.

13. The garment of claim 2, wherein the adjusting the intensity of the lights comprises at least one sensor and a controller, wherein the sensor has a proximal radius of influence greater than fifteen feet.

* * * * *